US012785805B2

(12) United States Patent
Lu et al.

(10) Patent No.: US 12,785,805 B2
(45) Date of Patent: Nov. 3, 2026

(54) OPTICAL COMMUNICATION SYSTEM AND METHOD OF SIGNAL TRANSMISSION

(71) Applicant: TAIWAN SEMICONDUCTOR MANUFACTURING COMPANY LTD., Hsinchu (TW)

(72) Inventors: You-Cheng Lu, Tainan City (TW); Stefan Rusu, Sunnyvale, CA (US); Lan-Chou Cho, Hsinchu City (TW); Ming Yang Jung, Kaohsiung City (TW); Tai-Chun Huang, New Taipei City (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 281 days.

(21) Appl. No.: 18/409,833

(22) Filed: Jan. 11, 2024

(65) Prior Publication Data

US 2025/0233662 A1 Jul. 17, 2025

(51) Int. Cl.
*H04B 10/2575* (2013.01)
*H04J 14/02* (2006.01)

(52) U.S. Cl.
CPC ...... *H04B 10/2575* (2013.01); *H04J 14/0227* (2013.01)

(58) Field of Classification Search
CPC .......................... H04B 10/2575; H04J 14/0227
See application file for complete search history.

(56) References Cited

U.S. PATENT DOCUMENTS

| | | | | |
|---|---|---|---|---|
| 6,038,357 | A * | 3/2000 | Pan | H04J 14/0246 385/11 |
| 6,385,206 | B1 * | 5/2002 | Nakata | H04J 14/025 370/425 |
| 6,751,002 | B2 * | 6/2004 | Ovadia | H04B 10/532 359/251 |
| 8,831,441 | B2 * | 9/2014 | Sasaki | H04B 10/66 398/79 |
| 9,464,883 | B2 * | 10/2016 | Swanson | G01B 9/02091 |
| 10,439,727 | B2 * | 10/2019 | Young | H04B 10/2581 |
| 10,809,459 | B2 * | 10/2020 | Liu | G02B 6/30 |
| 11,092,990 | B2 * | 8/2021 | Tanadi | H01L 25/105 |
| 11,194,947 | B2 * | 12/2021 | Hutton | G06F 30/34 |
| 12,055,912 | B2 * | 8/2024 | Lu | G05B 19/188 |
| 2005/0047799 | A1 * | 3/2005 | Coppinger | H04J 14/0298 398/188 |
| 2023/0077877 | A1 * | 3/2023 | Kung | G02B 6/4274 385/15 |

* cited by examiner

*Primary Examiner* — Kenneth N Vanderpuye
*Assistant Examiner* — Asif Shameem
(74) *Attorney, Agent, or Firm* — WPAT LAW; Anthony King

(57) ABSTRACT

An optical communication system and a method of signal transmission are provided. The optical communication system includes an optical fiber, a transmission module, and a reception module. The transmission module includes a first optical circuitry operable to: receive a plurality of input optical signals and data; modulate the plurality of input optical signals in accordance with the data and a polarization state of the plurality of input optical signals to generate a plurality of modulated optical signals; combine the plurality of modulated optical signals to form a combined signal; and relaying the combined optical signal to the optical fiber. The optical fiber transmits the combined optical signal to the reception module for detection.

20 Claims, 21 Drawing Sheets

110D

OPTICAL COMMUNICATION SYSTEM AND METHOD OF SIGNAL TRANSMISSION

BACKGROUND

Electro-optical modules can be used to convert electrical signals into optical signals and vice versa. Many different types of electro-optical modules are presently manufactured. Such modules have many applications, particularly within data-communications applications where information is carried by optical fibers.

Different types of electro-optical modules can be used to perform different functions. Reception modules and transmission modules, for example, are used to perform portions of an electro-optical conversion. More particularly, reception modules convert optical signals into electrical signals as part of a receiving function. Transmission modules convert electrical signals into optical signals as part of a transmitting function. Transceiver modules can be used to perform the electro-optical conversion for both receiving and transmitting processes.

One way to optimize investment in optical fiber communications in order to cope with increase in information transmission demand in optical fiber communications is to employ a more efficient modulation scheme for transmitted information to increase the spectral efficiency.

BRIEF DESCRIPTION OF THE DRAWINGS

Aspects of the present disclosure are best understood from the following detailed description when read with the accompanying figures. It should be noted that, in accordance with standard practice in the industry, various features are not drawn to scale. In fact, dimensions of the various features may be arbitrarily increased or reduced for clarity of discussion.

DETAILED DESCRIPTION

Figure 1:
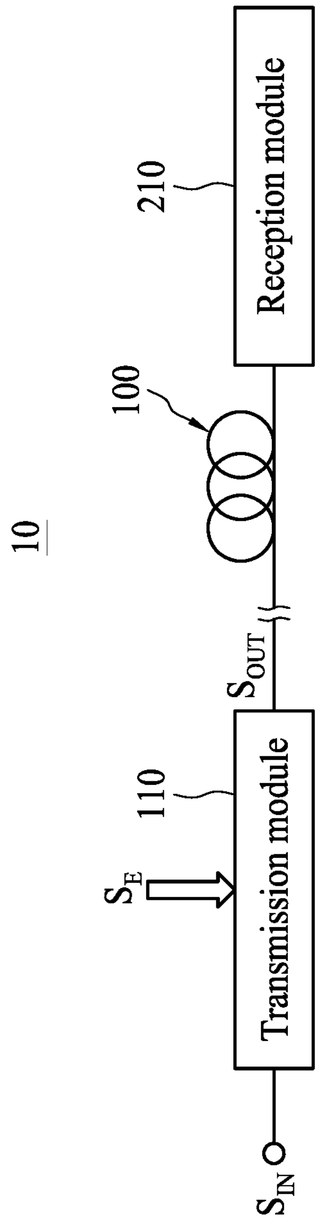
FIG. 1 is a schematic block diagram of an optical transceiver in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for a purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, but these elements, components, regions, layers and/or sections should not be limited by these terms. These terms may be only used to distinguish one element, component, region, layer or section from another.

The terms such as "first," "second" and "third" when used herein do not imply a sequence, order, or importance unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the normal deviation found in the respective testing measurements. Also, as used herein, the terms "substantially," "approximately" or "about" generally mean within a value or range (e.g., within 10%, 5%, 1%, or 0.5% of a given value or range) that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of time, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another end point or between two endpoints. All ranges disclosed herein are inclusive of the endpoints, unless specified otherwise.

FIG. 1 is a schematic block diagram of an optical communication system 10 in accordance with some embodiments of the present disclosure. Referring to FIG. 1, the optical communication system 10 includes an optical fiber 100, a transmission module 110, and a reception module 210, wherein the optical fiber 100 enables the transmission module 110 to have optical communication with the reception module 210.

The transmission module 110 is operable to modulate an input optical signal $S_{IN}$ with an electrical signal $S_E$ and generate an output signal $S_{OUT}$. The output signal $S_{OUT}$ is an optical signal that carries data representing information in the electrical signal $S_E$ and is also referred to as a "data-carrying optical signal." The transmission module 110 is further operable to transmit the output signal $S_{OUT}$ to the reception module 210 via the optical fiber 100.

Figure 2:
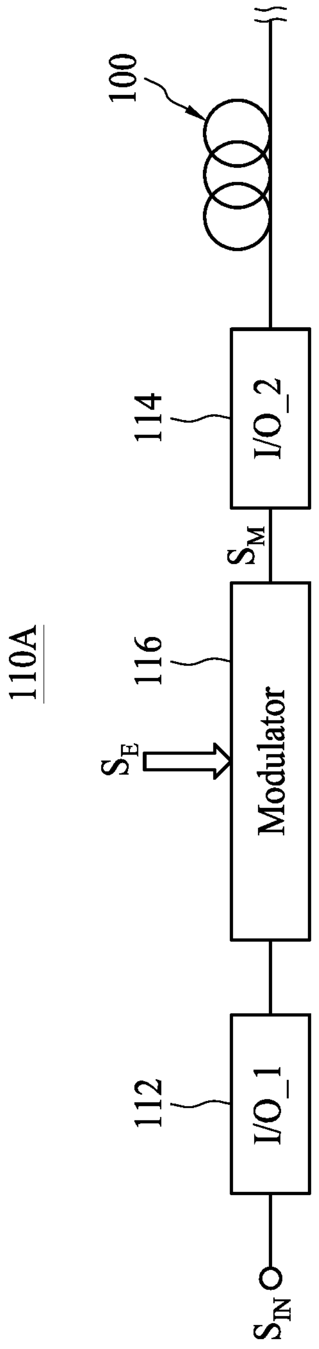
FIG. 2 is a schematic block diagram of a transmission module in accordance with some embodiments of the present disclosure.

FIG. 2 is a schematic block diagram of an optical fiber 100 and a transmission module 110A in accordance with some embodiments of the present disclosure. Referring to FIG. 2, the transmission module 110A is a one-channel transmission module. The transmission module 110 includes a first optical coupler (I/O_1) 112, a second optical coupler (I/O_2) 114, and a modulator 116. The first optical coupler 112 is used to couple an input optical signal $S_{IN}$ to the modulator 116. The modulator 116 receives an electrical signal $S_E$. The modulator 116 may be configured to modify phase, wavelength, or intensity of the input optical signal $S_{IN}$ in accordance with the electrical signal $S_E$ and generate a modulated signal $S_M$. The second optical coupler 114 is used to guide the modulated signal $S_M$ to the optical fiber 100. In some embodiments, the transmission module 110A has a data-carrying capacity of about 100 Gbps.

Figure 3:
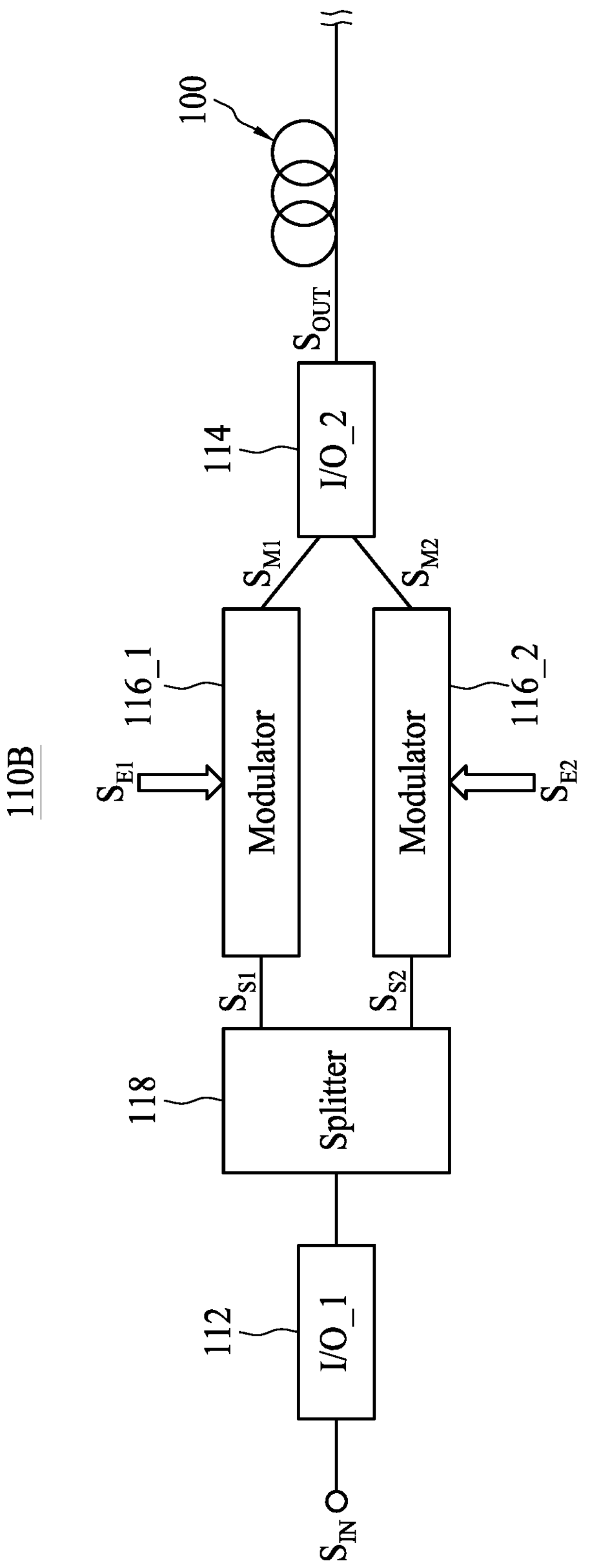
FIG. 3 is a circuit diagram of a transmission module in accordance with some embodiments of the present disclosure.

FIG. 3 is a schematic block diagram of an optical fiber 100 and a transmission module 110B in accordance with some embodiments of the present disclosure. Referring to FIG. 3, the transmission module 110B includes a first optical coupler (I/O_1) 112, a second optical coupler (I/O_2) 114, a pair of modulators 116_1 and 116_2, and a splitter 118 between the first optical coupler (I/O_1) 112 and the modulators 116_1 and 116_2.

The first optical coupler 112 is used to couple an input optical signal $S_{IN}$ to the splitter 118. The splitter 118 is, for example, a polarization splitter that includes one input port and a pair of output ports. The polarization splitter 118 is characterized by two output ports that supply one or two orthogonal polarizations of the input optical signal $S_{IN}$.

In embodiments where the input optical signal $S_{IN}$ is in a mixed or random polarization state, e.g., both transverse electric (TE) and transverse magnetic (TM) polarization states, the splitter 118 is capable of splitting the input optical signal $S_{IN}$ into a first polarized signal $S_{S1}$ and a second polarized signal $S_{S2}$. The first polarized signal $S_{S1}$ may have a first polarization state (e.g., the TE polarization state), and the second polarized signal $S_{S2}$ may have a second polarization state (e.g., the TM polarization state). The first and second polarized signals $S_{S1}$ and $S_{S2}$ may be utilized to carry different information, in order to increase a data-carrying capacity of the optical communication system 10. In embodiments where the input optical signal $S_{IN}$ is confined to a single polarization state (either the TE or TM polarization state), then an output signal will appear at only one of the output ports corresponding to such polarization state.

The modulator 116_1 is configured to modulate the first polarized signal $S_{S1}$ in accordance with an electrical signal $S_{E1}$ and generate a first modulated signal $S_{M1}$. The modulator 116_2 is configured to modulate the second polarized signal $S_{S2}$ in accordance with the electrical signal $S_{E2}$ and generate a second modulated signal $S_{M2}$. The first modulated signal $S_{M1}$ and the second modulated signal $S_{M2}$ are combined together and sent to the optical fiber 100 via the second optical coupler 114. In some embodiments, the transmission module 110B has a data-carrying capacity equal to twice the data-carrying capacity of the transmission module 110A, i.e., about 200 Gbps.

Figure 4:
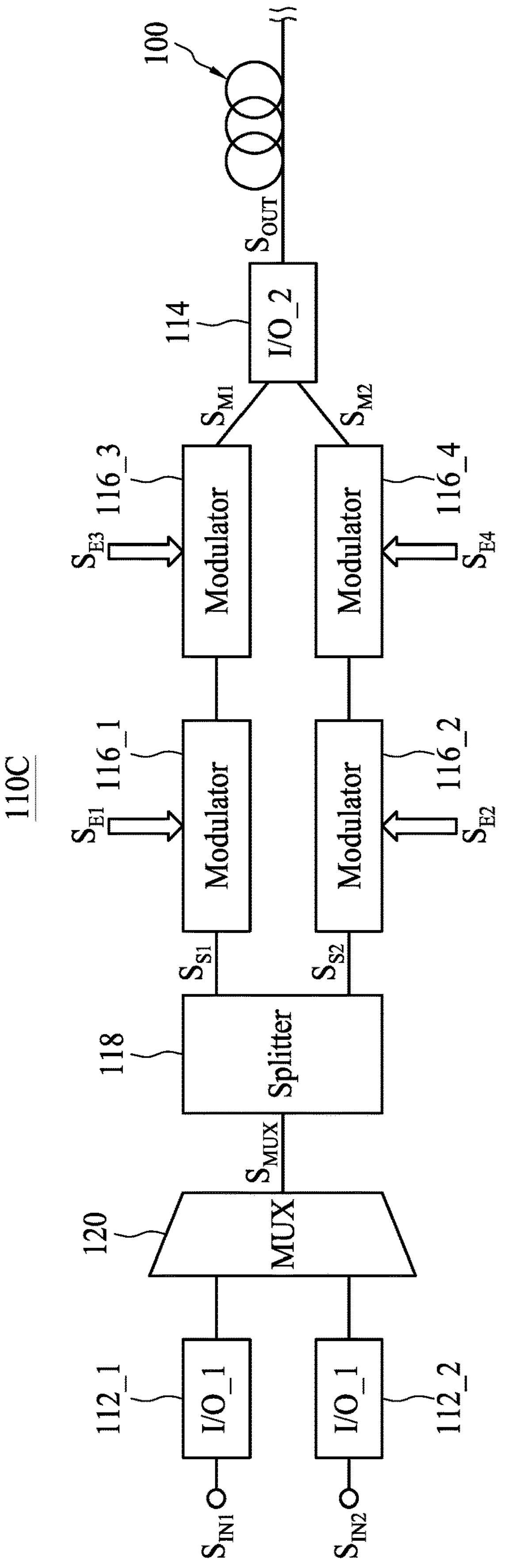
FIG. 4 is a circuit diagram of a transmission module in accordance with some embodiments of the present disclosure.

FIG. 4 is a schematic block diagram of an optical fiber 100 and a transmission module 110C in accordance with some embodiments of the present disclosure. Referring to FIG. 4, the transmission module 110C may include a pair of first optical couplers 112_1 and 112_2, a second optical coupler 114, a plurality of modulators 116_1 to 116_4, a splitter 118, and a multiplexer (MUX) 120 between the pair of first optical couplers 112_1 and 112_2 and the splitter 118. Input optical signals $S_{IN1}$ and $S_{IN2}$ having different wavelengths enter the transmission module 110C via the first optical couplers 112_1 and 112_2, respectively. The input optical signal $S_{IN1}$ may have a first wavelength, and the input optical signal $S_{IN2}$ may have a second wavelength. The first optical couplers 112_1 and 112_2 are used for guiding the input optical signals $S_{IN1}$ and $S_{IN2}$ to the multiplexer 120.

The multiplexer 120 is a wavelength multiplexer. For example, the multiplexer 120 is a wavelength-division multiplexing (WDM) device. The multiplexer 120 includes a pair of input ports and an output port, wherein the input ports are coupled to the first optical couplers 112_1 and 112_2, respectively, and the output port is coupled to the splitter 118. The multiplexer 120 is configured to aggregate the input optical signals $S_{IN1}$ and $S_{IN2}$ received through the first optical couplers 112_1 and 112_2 to generate a composite signal $S_{MUX}$. The composite signal $S_{MUX}$ is a wavelength division multiplexed (WDM) optical signal. In some embodiments, the multiplexer 120 receives the input optical signals $S_{IN1}$ and $S_{IN2}$ propagating from different signal waveguides and forwards the composite optical signal $S_{MUX}$ including both the input optical signals $S_{IN1}$ and $S_{IN2}$ to the splitter 118 via a single waveguide.

When the input optical signals $S_{IN1}$ and $S_{IN2}$ within the composite signal $S_{MUX}$ have different polarizations, the splitter 118 is a 1-to-2 polarization splitter. The splitter 118 includes an input port and two output ports. The composite signal $S_{MUX}$ is fed to the splitter 118 via the input port of the splitter 118. The splitter 118 receives the composite signal $S_{MUX}$ from the input port and splits the composite signal $S_{MUX}$ into two polarized signals, (i.e., a first polarized signal $S_{S1}$ and a second polarized signal $S_{S2}$). The first polarized signal $S_{S1}$ is a portion of the composite signal $S_{MUX}$ that has a first polarization. The second polarized signal $S_{S2}$ is a portion of the composite signal $S_{MUX}$ that has a second polarization. The first polarized signal $S_{S1}$ is forwarded to the modulators 116_1 and 116_3 from one output port of the splitter 118, and the second polarized signal $S_{S2}$ is forwarded to the modulators 116_2 and 116_4 from another output port of the splitter 118.

The modulators 116_1 and the 116_3 are configured to modulate the first polarized signal $S_{S1}$ to generate a first modulated signal $S_{M1}$. In some embodiments, the modulator 116_1 is configured to modulate the first polarized signal $S_{S1}$ characterized by the first wavelength in accordance with an electrical signal $S_{E1}$, while not modulate the first polarized signal $S_{S1}$ characterized by second wavelength. The modulator 116_3 is configure to modulate the first polarized signal $S_{S1}$ characterized by the second wavelength in accordance with an electrical signal $S_{E3}$, while not modulate the first polarized signal $S_{S1}$ characterized by first wavelength.

The modulators 116_2 and the 116_4 are configured to modulate the second polarized signal $S_{S2}$ to generate a second modulated signal $S_{M2}$. The modulator 116_2 is configured to modulate the second polarized signal $S_{S2}$ characterized by the first wavelength in accordance with an electrical signal $S_{E2}$, while not modulate the first polarized signal $S_{S1}$ characterized by second wavelength. The modulator 116_4 is configured to modulate the second polarized signal $S_{S2}$ characterized by the second wavelength in accordance with an electrical signal $S_{E4}$, while not modulate the second polarized signal $S_{S2}$ characterized by first wavelength.

The first modulated signal $S_{M1}$ and the second modulated signal $S_{M2}$ are combined together and sent to the optical fiber 100 via the second optical coupler 114. In some embodiments, the transmission module 110C has a data-carrying capacity equal to four times the data-carrying capacity of the transmission module 110A, i.e., about 400 Gbps.

Figure 5:
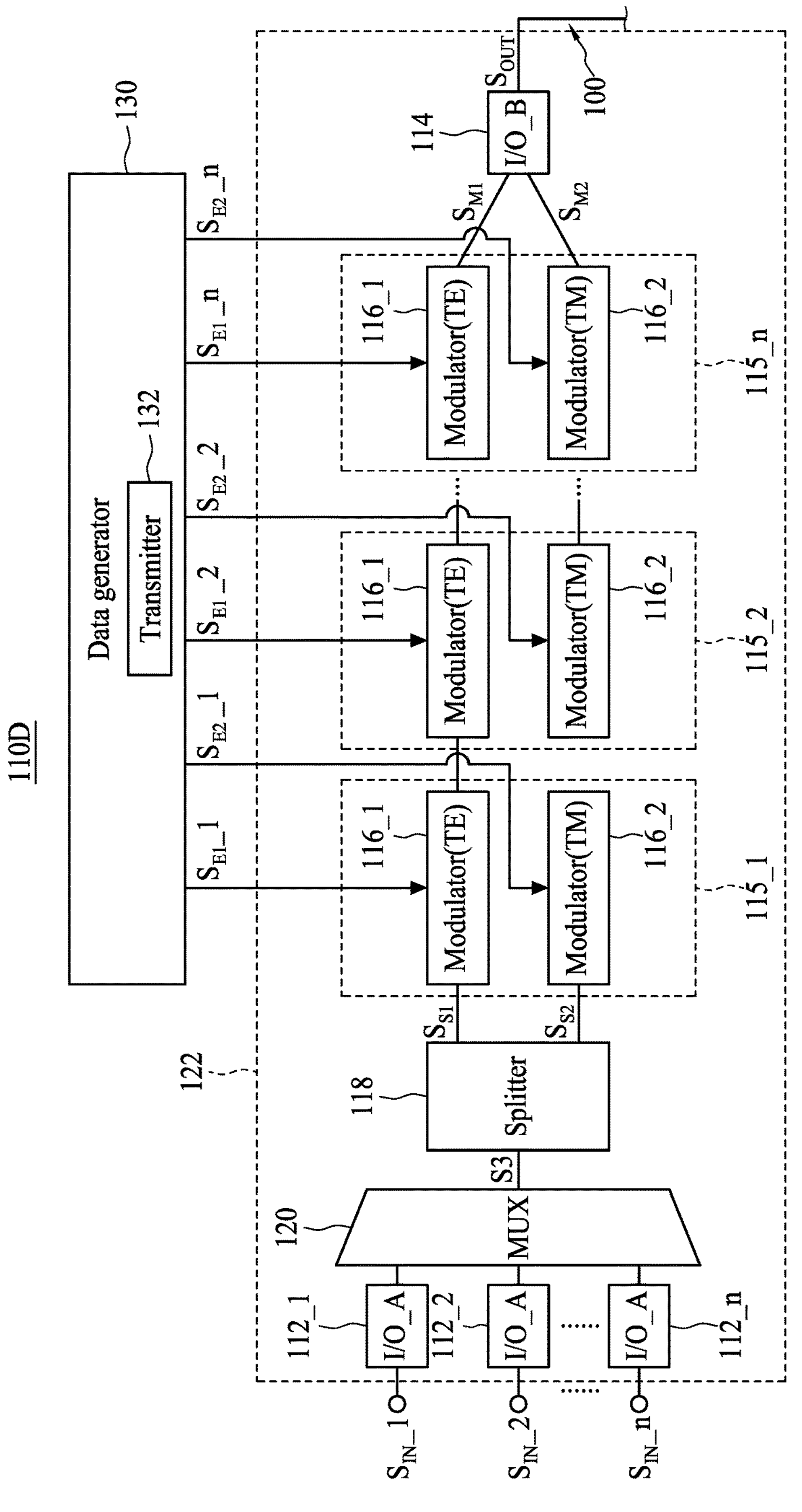
FIG. 5 is a circuit diagram of a transmission module in accordance with some embodiments of the present disclosure.

FIG. 5 is a schematic block diagram of a transmission module 110D in accordance with some embodiments of the present disclosure. Referring to FIG. 5, the transmission module 110D may include a plurality of first optical couplers (I/O_A) 112_1 to **112_*n*, a second optical coupler (I/O_B) 114, a plurality of modulating units 115_1 to 115_*n*, a splitter 118, and a multiplexer (MUX) 120 between the plurality of first optical couplers 112_1 to 112_*n* and the splitter 118**.

The first optical couplers 112_1 to **112_*n*** receive input optical signals $S_{IN}$_1 to $S_{IN}$_*n*, respectively. More particularly, the first input optical couplers 112_1 to **112_*n*** are configured to relay the input optical signals $S_{IN}$_1 to $S_{IN}$_*n* to the multiplexer 120. In some embodiments, the first optical couplers 112_1 to **112_*n* can be grating couplers or edge couplers. The first optical couplers 112_1 to 112_*n*** may be one-dimensional optical couplers. Each of the input optical signals $S_{IN}$_1 to $S_{IN}$_*n* has a distinct wavelength.

The multiplexer 120 includes a plurality of input ports and an output port; the input ports of the multiplexer 120 are coupled to the first optical couplers 112_1 to **112_*n*, respectively, and the output port is coupled to the splitter 118. The multiplexer 120** is configured to join the first optical signals $S_{IN}$_1 to $S_{IN}$_*n* together, thereby forming a composite signal $S_{MUX}$.

The splitter 118 includes an input port and a plurality of output ports. The input port of the splitter 118 is coupled to the output port of the multiplexer 120, and the output ports of the splitter 118 are coupled to the modulating units 115_1 to **115_*n*. In some embodiments, the splitter 118 is a polarization splitter. Hence, the composite signal $S_{MUX}$ passing through the splitter 118** is split into a first polarized signal $S_{S1}$ (e.g., a TE-polarized signal) and a second polarized signal $S_{S2}$ (e.g., a TM-polarized signal).

Each of the modulating units 115_1 to **115_*n* includes a pair of modulators 116_1 and 116_2. The modulators 116_1** are configured to modulate the first polarized signal $S_{S1}$ having the first distinct wavelength in accordance with electrical signals $S_{E1}$_1 to $S_{E1}$_*n*, thereby generating a first modulated signal $S_{M1}$. The modulators 116_2 are configured to modulate the second polarized signal $S_{S2}$ in accordance with electrical signals $S_{E2}$_1 to $S_{E2}$_*n*, thereby generating a second modulated signal $S_{M2}$. In some embodiments, the modulators 116_1 are TE-polarized modulators, and the modulators 116_2 are TM-polarized modulators. The polarization splitter 118 is configured to split the composite signal $S_{MUX}$ into the first polarized signal $S_{S1}$ and the second polarized signal $S_{S2}$, resulting in reduction of the processing speed of the modulators 116_1 and 116_2.

The first modulated signal $S_{M1}$ and the second modulated signal $S_{M2}$ are combined together and sent to the optical fiber 100 via the second optical coupler 114. The second optical coupler 114 may be an edge coupler or a two-dimensional grating coupler used to join the first and second modulated signals $S_{M1}$ and $S_{M2}$, thereby forming an output optical signal $S_{OUT}$ to be sent to the optical fiber 100.

Figure 6:
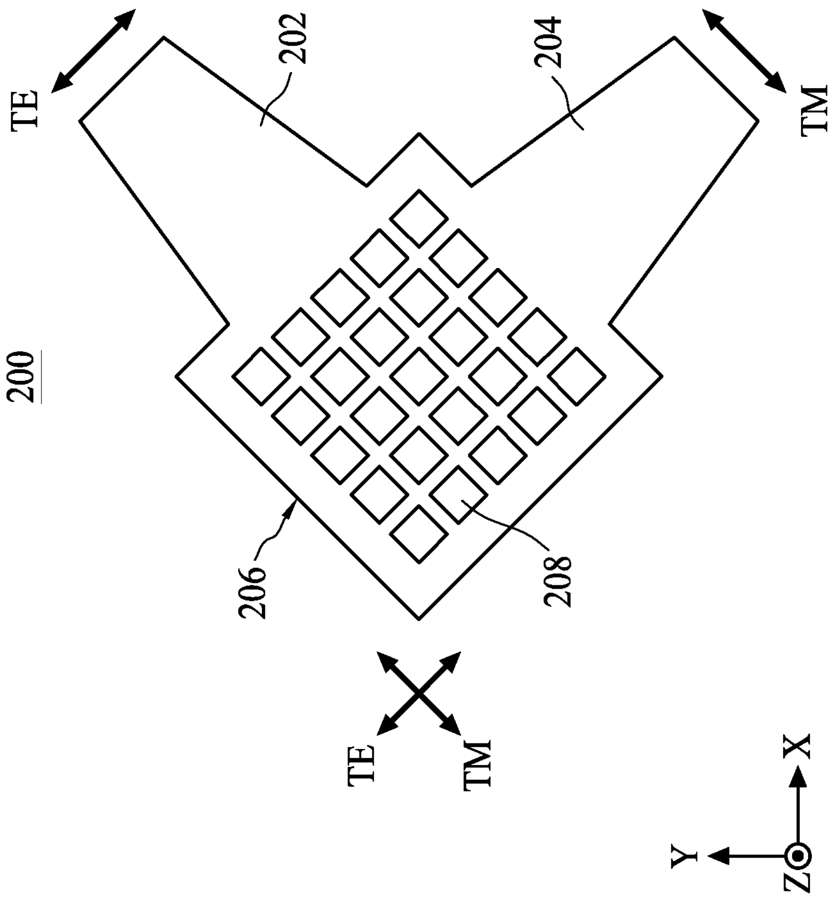
FIG. 6 is a schematic diagram of a two-dimensional grating coupler in accordance with some embodiments of the present disclosure.

FIG. 6 is a schematic diagram of a two-dimensional grating coupler 200 in accordance with some embodiments of the present disclosure. Referring to FIG. 6, the two-dimensional grating coupler 200 may include a first taper structure 202, a second taper structure 204, and a grating structure 206. The grating structure 206 can be formed at an intersection of a pair of orthogonal integrated taper structures (e.g., the first taper structure 202 and the second taper structure 204). The grating structure 206 includes an array of holes 208 (or, alternatively, an array of posts (not shown)).

With reference to FIGS. 5 and 6, the first modulated signal $S_{M1}$ and the second modulated signal $S_{M2}$ are, for example, provided to the two-dimensional grating coupler 200 through the first taper structure 202 and the second taper structure 204, respectively. The grating structure 206 may be utilized to join the first modulated signal $S_{M1}$ and the second modulated signal $S_{M2}$, and therefore generates the output optical signal $S_{OUT}$ to be transmitted to the reception module 210 (shown in FIG. 1) via the optical fiber 100.

Figure 7:
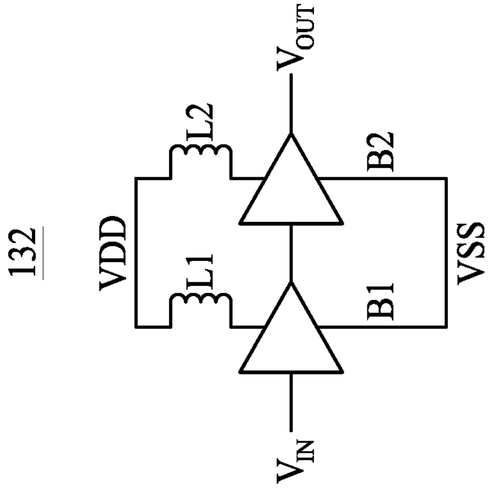
FIG. 7 is a circuit diagram of a transmitter in accordance with some embodiments of the present disclosure.

Referring back to FIG. 5, in some embodiments, the transmission module 110D can further include a data generator 130 configured to generate the electrical signals $S_{E1}$_1 to $S_{E2}$_*n*. The data generator 130 includes a transmitter 132 configured to drive the modulators 116_1 and 116_2 to modulate the first and second polarized signals $S_{S1}$ and $S_{S2}$. FIG. 7 is a circuit diagram of the transmitter 132 in accordance with some embodiments of the present disclosure.

With reference to FIG. 7, the transmitter 132 receives an input (voltage) signal $V_{IN}$ and then generates an output (voltage) signal $V_{OUT}$. The transmitter 132 may be adapted to high frequency and configured to drive the modulator 116_1 or 116_2. In some embodiments, the transmitter 132 include a pair of buffers B1 and B2 and a pair of inductors L1 and L2. The buffers B1 and B2 are connected in series. More particularly, an output terminal of the buffer B1 is connected to an input terminal of the buffer B2. An input terminal of the buffer B1 receives the input (voltage) signal $V_{IN}$, and an output terminal of the buffer B2 provides the output (voltage) signal $V_{OUT}$. The inductors L1 and L2 are coupled to the buffers B1 and B2, respectively, between a power supply voltage level VDD and a reference level VSS.

Figure 8:
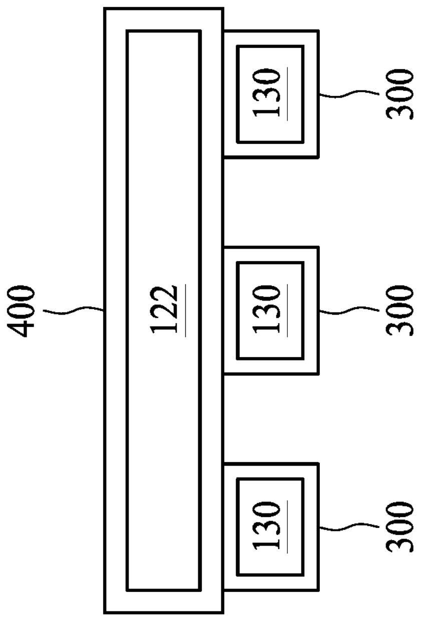
FIG. 8 is a cross-sectional view of a transmission module in accordance with some embodiments of the present disclosure.

FIG. 8 is a cross-sectional view of a transmission module in accordance with some embodiments of the present disclosure. Referring to FIGS. 5 and 8, the first optical couplers 112_1 to 112_*n*, the second optical coupler 114, the modulators 116_1 and 116_2, the splitter 118, and the multiplexer 120 are collectively referred to herein as a first optical circuitry 122. The data generator 130 may include a plurality of electronic devices integrated into a first electronic die 300. The first optical circuitry 122 includes a plurality of optical devices (e.g., the first optical couplers 112_1 to 112_*n*, the second optical coupler 114, the splitter 118, and the multiplexer 120) and a plurality of optoelectronic devices (e.g., the modulators 116_1 and 116_2). The optical and optoelectronic devices may be integrated into a first photonic die 400. The first electronic die 300 is coupled to the first photonic die 400, as shown in FIG. 8. The first photonic die 400 and the first electronic die 300 may be stacked in a three dimensional integrated circuit (3DIC) structure. The first electronic die 300 may be bonded to the first photonic die 400 through, for instance, hybrid bonding. The first electronic die 300 and the first photonic die 400 may be bonded in a front-to-front arrangement, a front-to-back arrangement, or a back-to-back arrangement.

Referring to FIGS. 5 and 8, in some circumstances, the first electronic die 300 has a relatively short service life compared to a service life of the first photonic die, so that the service life of the transmission module 110D expires earlier. Such short service life of the transmission module 110D may pose critical challenges to a service life and reliability of an overall device. The transmission module 110D may thus include multiple first electronic dies including the data generator 130. Only one first electronic die 300 is activated during normal operation of the transmission module 110D, and other first electronic dies 300 serve as backup electronic dies that can be used to replace a failed die during the normal operation. Therefore, the overall service life of the transmission module 110D can be extended. In addition, the electronic die 300 may have a relatively small footprint compared to a footprint of the silicon photonic die. In order to improve uniformity, electronic dies 300 may be laterally separated from each other, and the silicon photonic die 400 is stacked over the electronic dies 300.

In some embodiments, the modulators 116_1 and 116_2 are optical in-phase/quadrature (IQ) modulators. The modulators 116_1 and 116_2 may modulate the first and second polarized signals $S_{S1}$ and $S_{S2}$ according to the data signal the data $S_{E1}$_1 to $S_{E2}$_*n* with a quadrature phase shift keying (QPSK) modulation scheme, in order to increase a data-carrying capacity of the transmission module 110D. The IQ modulator encodes information on both amplitude and phase of the first and second polarized signals $S_{S1}$ and $S_{S2}$. Accordingly, 2 bits of binary signal per transmission symbol (i.e., 00, 01, 10, 11) can be encoded, as shown in FIG. 9 (*a*).

An example of such a multi-level modulation format includes quadrature phase-shift keying (QPSK) where multiple data bits may be encoded on a single transmitted symbol using multiple phases. In particular, QPSK is a modulation technique for transmitting a pair of data bits with a four-level code where each pair of bits is encoded during each symbol period as one of four possible phases of a transmitted carrier signal. Because QPSK has four possible phase states, two bits per symbol may be encoded using this format. For example, the four phases in which a carrier may be sent in QPSK are 45° (π/4) which corresponds to bits "00", 135° (3π/4) which corresponds to bits "01", 225° (−3π/4) which corresponds to bits "11", and 315° (−π/4) which corresponds to bits "10". Each pair of bits may be derived sequentially from a same data stream where a bit period for the data stream is one half the symbol period of a resulting QPSK signal.

One higher multi-level modulation format used to accomplish these high transmission rates is 16 quadrature amplitude modulation (QAM). The 16 QAM format carries information about both the amplitude and phase of the signal which has two components each with a phase relation of 90 degrees (in-phase (I) and quadrature phase (Q) components). In such manner, the 16 QAM modulation format can transmit four (4) bits of information per symbol, thereby increasing the data-carrying capacity of the transmission module 110D.

Figure 9:
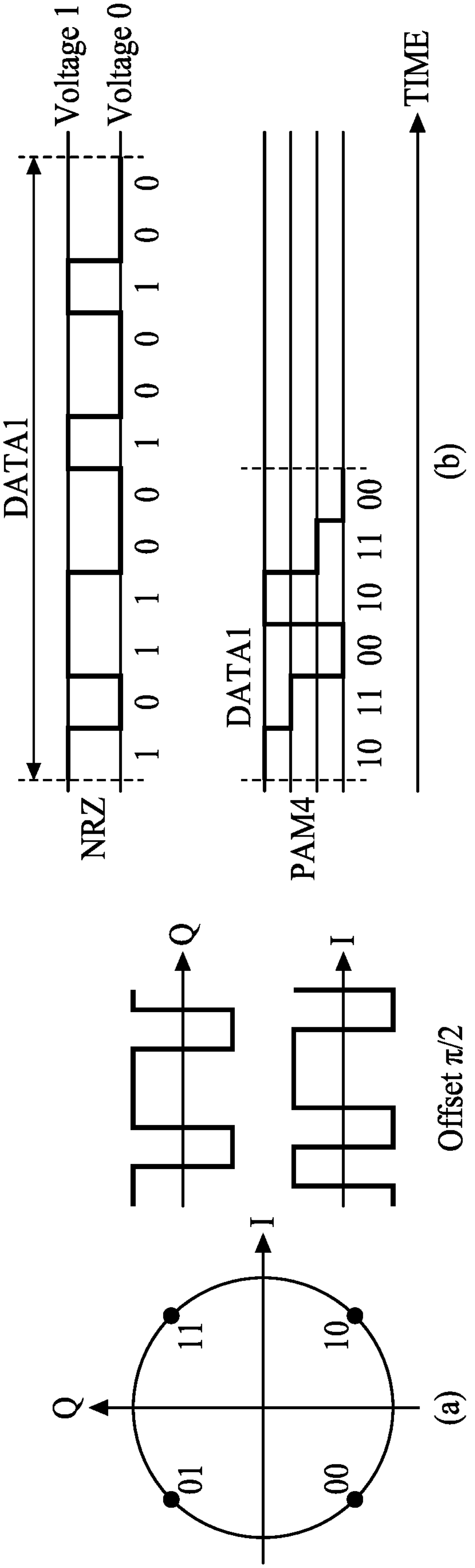
FIG. 9 is an illustration of modulation schemes in accordance with some embodiments of the present disclosure.

With reference to FIGS. 5 AND 9(*b*), in some embodiments, the modulator 116_1 and 116_2 may modulate the first and second polarized signals $S_{S1}$ and $S_{S2}$ respectively by the electrical signals $S_{E1}$_1 to $S_{E2}$_*n* with a non-return-to-zero (NRZ) modulation scheme or a four-level pulse modulated amplitude (PAM4) modulation scheme. The NRZ modulation scheme is configured to encode data using binary code. The NRZ modulation scheme uses low and high signal level to represent the 1/0 information of data. The NRZ is a modulation technique for transmitting only one data bit (i.e. 0 or 1) during each symbol period.

The PAM4 modulation scheme is configured to encode two-bit data into a four-level symbol that gets transmitted during each symbol period. The PAM4 modulation scheme can achieve twice the data rate as compared to that of two-level encoding schemes at the same bandwidth, such as the NRZ modulation scheme.

Figure 10:
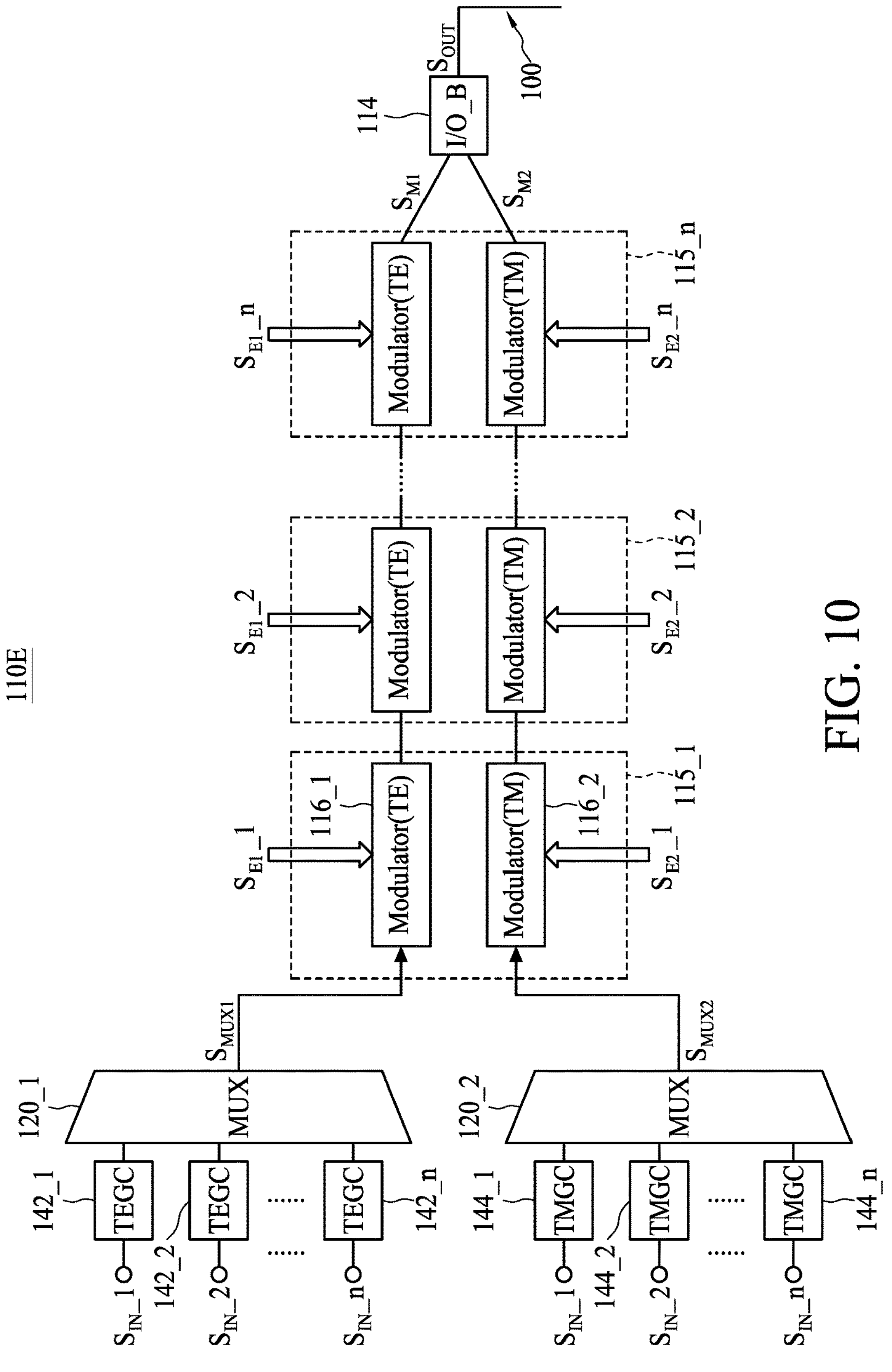
FIG. 10 is a circuit diagram of a transmission module in accordance with some embodiments of the present disclosure.

FIG. 10 is a schematic block diagram of a transmission module 110E in accordance with some embodiments of the present disclosure. Referring to FIG. 10, the transmission module 110E includes a plurality of TE-polarized grating couplers (TEGC) 142_1 to 142_*n*, a plurality of TM-polarized grating couplers (TMGC) 144_1 to 144_*n*, a pair of multiplexers (MUX) 120_1 and 120_2, a plurality of modulating units 115_1 to 115_*n*, and a second optical coupler (I/O_B) 114. The transmission module 110E receives input optical signals $S_{IN}$_1 to $S_{IN}$_*n*, wherein each of the input optical signals $S_{IN}$_1 to $S_{IN}$_*n* has a distinct wavelength.

The TE-polarized grating couplers 142_1 to 142_*n* are capable of providing a portion of the input optical signals $S_{IN}$_1 to $S_{IN}$_*n* that have a TE polarization to the multiplexer 120_1. The TM-polarized grating couplers 144_1 to 144_*n* are capable of providing a portion of the input optical signals $S_{IN}$_1 to $S_{IN}$_*n* having a TM polarization to the multiplexer 120_2.

The multiplexer 120_1 is configured to join the TE-polarized input optical signals $S_{IN}$_1 to $S_{IN}$_*n* received through the optical couplers 142_1 to 142_*n* together, and thereby generate a first composite signal $S_{MUX1}$. The multiplexer 120_2 is configured to aggregate the TM-polarized input optical signals $S_{IN}$_1 to $S_{IN}$_n received through the optical couplers 144_1 to 144_n and generate a second composite signal $S_{MUX2}$. The first and second composite signals $S_{MUX1}$ and $S_{MUX2}$ are forwarded to the modulating units 115_1 to 115_n.

Each of the modulating units 115_1 to 115_n includes a pair of modulators 116_1 and 116_2. The modulators 116_1 of the modulating units 115_1 to 115_n are configured to modulate the first composite signal $S_{MUX1}$ in accordance with electrical signals $S_{E1}$_1 to $S_{E1}$_n, thereby generating a first modulated signal $S_{M1}$. In some embodiments, the modulator 116_1 of the modulating unit 115_1 is configured to modulate the input optical signal $S_{IN}$_1 within the first composite signal $S_{MUX1}$ in accordance with the electrical signal $S_{E1}$_1. The modulator 116_1 of the modulating unit 115_2 is configured to module the input optical signal $S_{IN}$_2 within the first composite signal $S_{MUX1}$ in accordance with the electrical signal $S_{E1}$_2. The modulator 116_1 of the modulating unit 115_n is configured to modulate the input optical signal $S_{IN}$_n within the first composite signal $S_{MUX1}$ in accordance with the electrical signal $S_{E1}$_2.

The modulators 116_2 of the modulating units 115_1 to 115_n are configured to modulate the second composite signal $S_{MUX2}$ in accordance with the electrical signals $S_{E2}$_1 to $S_{E2}$_n, thereby generating a second modulated signal $S_{M2}$. In some embodiments, the modulator 116_2 of the modulating unit 115_1 is configured to modulate the input optical signal $S_{IN}$_1 within the second composite signal $S_{MUX2}$ in accordance with the electrical signal $S_{E2}$_1. The modulator 116_2 of the modulating unit 115_2 is configured to modulate the input optical signal $S_{IN}$_2 within the second composite signal $S_{MUX2}$ in accordance with the electrical signal $S_{E2}$_2. The modulator 116_2 of the modulating unit 115_n is configured to modulate the input optical signal $S_{IN}$_n within the second composite signal $S_{MUX2}$ in accordance with the electrical signal $S_{E1}$_n. The first modulated signal $S_{M1}$ and the second modulated signal $S_{M2}$ are combined together and sent to an optical fiber 100 via the second optical coupler 114.

Figure 11:
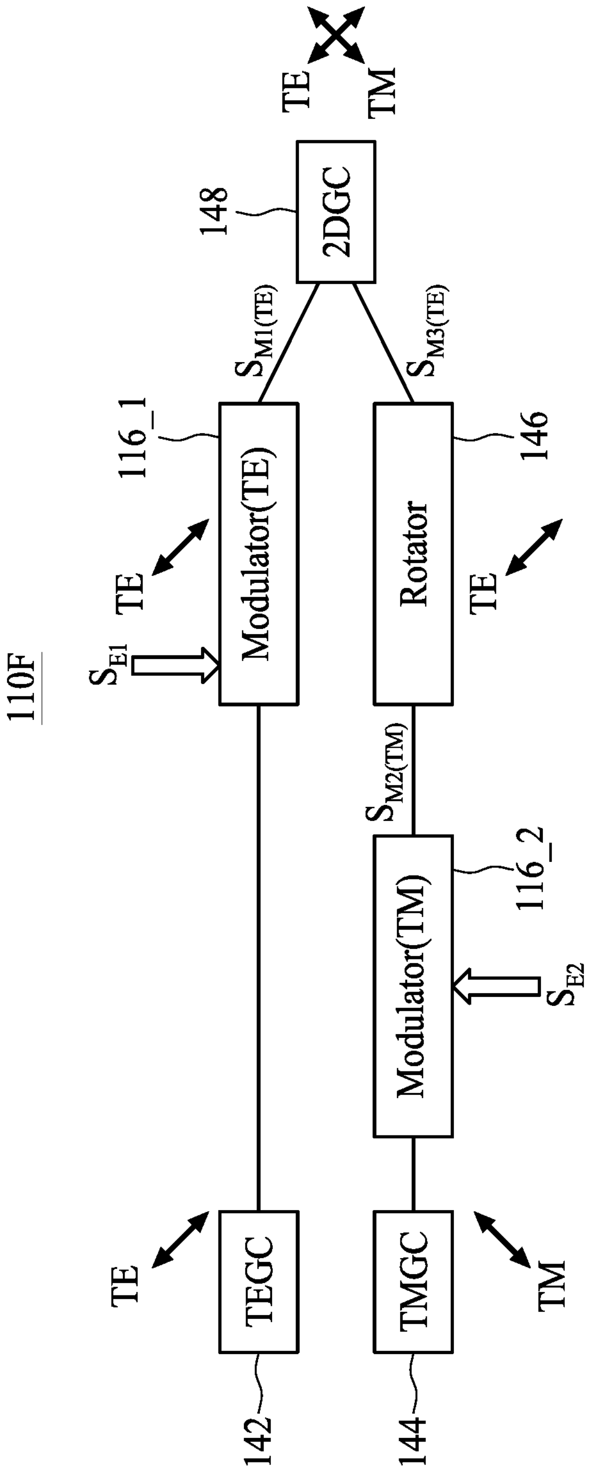
FIG. 11 is a circuit diagram of a transmission module in accordance with some embodiments of the present disclosure.

FIG. 11 is a schematic block diagram of a transmission module 110F in accordance with some embodiments of the present disclosure. Referring to FIG. 11, the transmission module 110E includes a TE-polarized grating coupler (TEGC) 142, a TM-polarized grating coupler (TMGC) 144, a first modulator 116_1, a second modulator 116_2, a rotator 146, and a two-dimensional grating coupler (2DGC) 148. The TE-polarized grating coupler 142 is capable of relaying a TE-polarized optical signal to the first modulator 116_1. The first modulator 116_1 is configured to modulate the TE-polarized optical signal in accordance with an electrical signal $S_{E1}$, and thereby generate a first modulated signal $S_{M1(TE)}$.

The TM-polarized grating coupler 144 is capable of relaying a TM-polarized optical signal to the second modulator 116_2. The second modulator 116_2 is configured to modulate the TM-polarized optical signal in accordance with an electrical signal $S_{E2}$, and thereby generate a second modulated signal $S_{M2(TM)}$. The second modulated signal $S_{M2(TM)}$ is then provided to the rotator 146. The rotator 146 is a polarization rotator. The rotator 146 is capable of changing polarization of the second modulated signal $S_{M2(TM)}$ from the TM polarization to the TE polarization, thereby generating a third modulated signal $S_{M3(TE)}$. The first modulated signal $S_{M1(TE)}$ and the third modulated signal $S_{M3(TE)}$ are combined together and sent to an optical fiber via the two-dimensional grating coupler 148.

Figure 12:
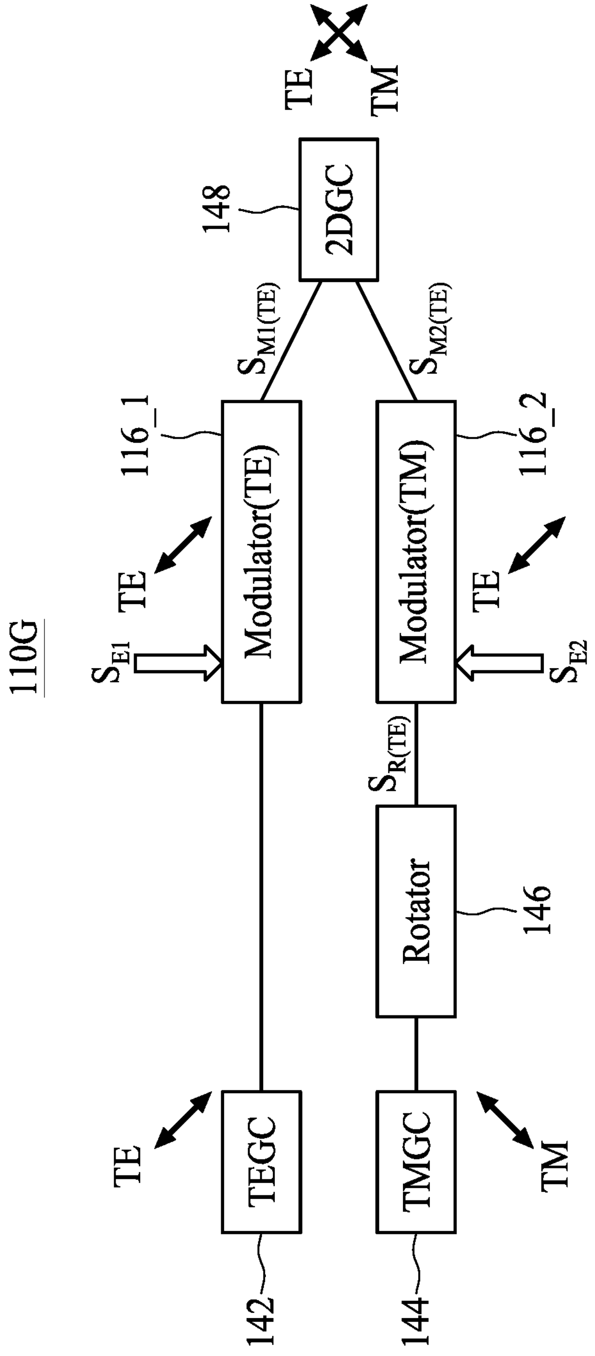
FIG. 12 is a circuit diagram of a transmission module in accordance with some embodiments of the present disclosure.

FIG. 12 is a schematic block diagram of a transmission module 110G in accordance with some embodiments of the present disclosure. Referring to FIG. 12, the transmission module 110G includes a TE-polarized grating coupler (TEGC) 142, a TM-polarized grating coupler (TMGC) 144, a first modulator 116_1, a second modulator 116_2, a rotator 146, and a two-dimensional grating coupler (2DGC) 148. The TE-polarized grating coupler 142 is capable of relaying a TE-polarized optical signal to the first modulator 116_1. The first modulator 116_1 is configured to modulate the TE-polarized optical signal in accordance with an electrical signals $S_{E1}$, and thereby generate a first modulated signal $S_{M1(TE)}$.

The TM-polarized grating coupler 144 is capable of relaying a TM-polarized optical signal to the rotator 146. The rotator 146 is a polarization rotator. The rotator 146 is arranged between the TM-polarized grating coupler 144 and the second modulator 116_2. The rotator 146 is capable of changing polarization of the TM-polarized optical signal from the TM polarization to the TE polarization, thereby generating a rotated signal $S_{R(TE)}$.

The second modulator 116_2 is configured to modulate the rotated signal $S_{R(TE)}$ in accordance with an electrical signals $S_{E2}$, and thereby generate a second modulated signal $S_{M2(TE)}$. The second modulated signal $S_{M2(TE)}$ is then provided to the two-dimensional grating coupler 148. The first modulated signal $S_{M1(TE)}$ and the second modulated signal $S_{M2(TE)}$ are combined together and sent to an optical fiber via the two-dimensional grating coupler 148.

Figure 13:
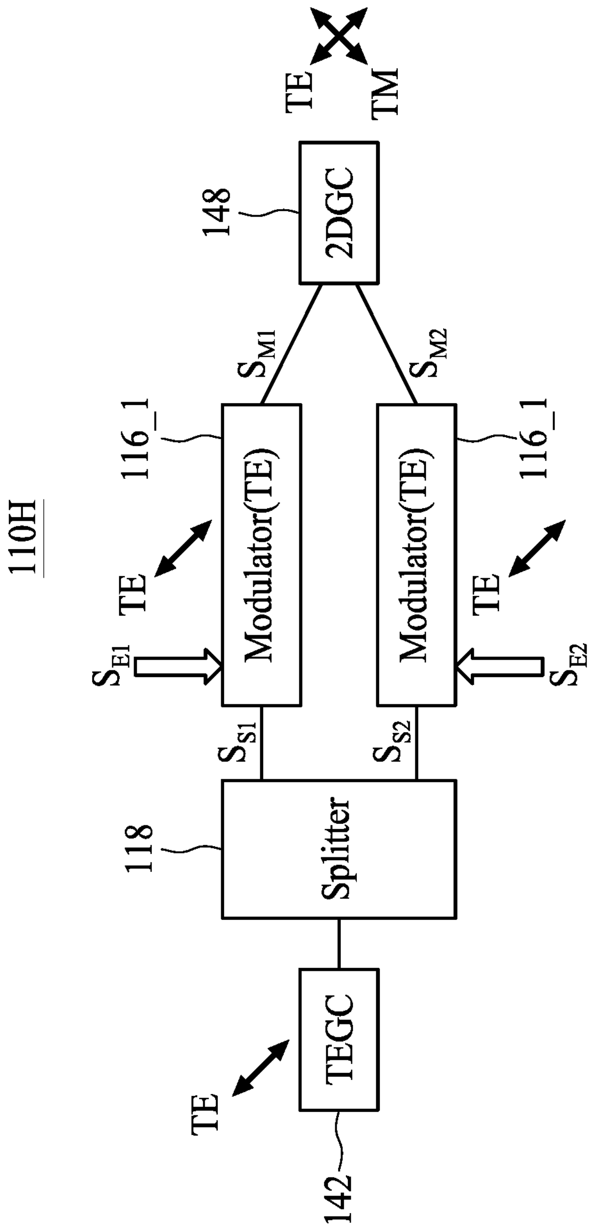
FIG. 13 a circuit diagram of a transmission module in accordance with some embodiments of the present disclosure.

FIG. 13 is a schematic block diagram of a transmission module 110H in accordance with some embodiments of the present disclosure. Referring to FIG. 13, the transmission module 110H includes a TE-polarized grating coupler (TEGC) 142, a splitter 118, a pair of first modulators 116_1, and a two-dimensional grating coupler (2DGC) 148. The TE-polarized grating coupler 142 is capable of relaying a TE-polarized optical signal to the splitter 118. The splitter 118 is capable of splitting the TE-polarized optical signal into a first polarized signal $S_{S1}$ and a second polarized signal $S_{S2}$ having TE polarization.

One of the first modulators 116_1 is configured to modulate the first polarized optical signal $S_{S1}$ in accordance with an electrical signals $S_{E1}$, and thereby generate a first modulated signal $S_{M1(TE)}$. The other first modulator 116_1 is also configured to modulate the second TE-polarized optical signal $S_{S1}$ in accordance with an electrical signals $S_{E2}$, and thereby generate a second modulated signal $S_{M2(TE)}$. The first modulated signal $S_{M1(TE)}$ and the second modulated signal $S_{M2(TE)}$ are combined together and sent to an optical fiber via the two-dimensional grating coupler 148.

Figure 14:
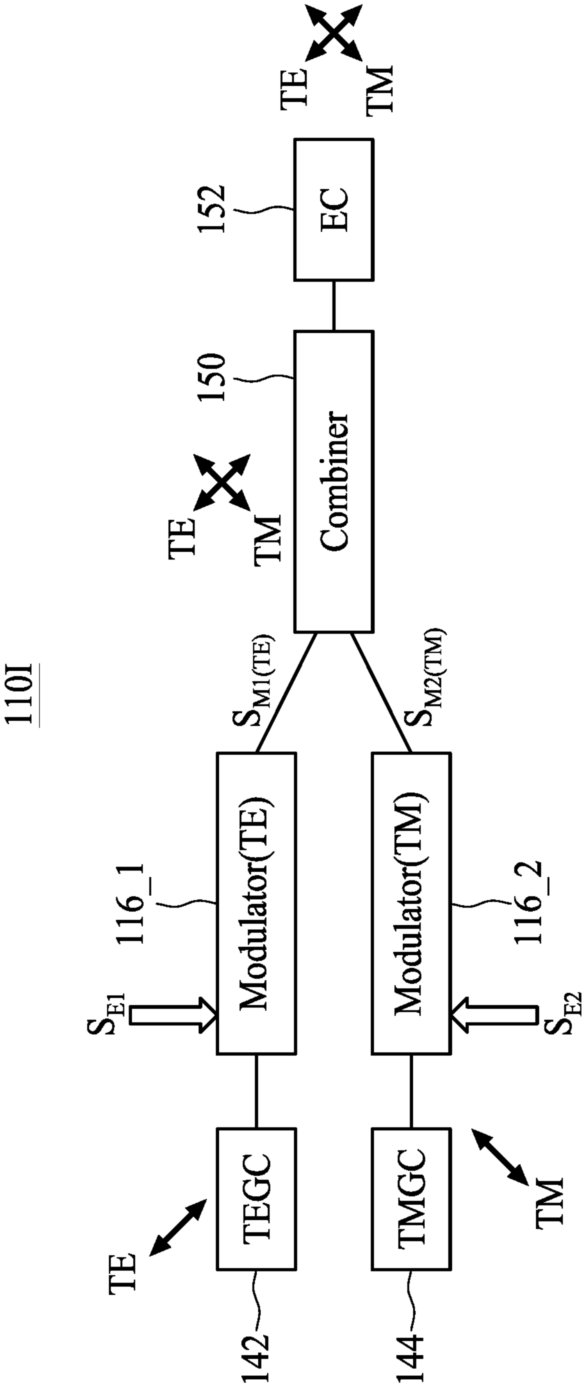
FIG. 14 is a circuit diagram of a transmission module in accordance with some embodiments of the present disclosure.

FIG. 14 is a schematic block diagram of a transmission module 110I in accordance with some embodiments of the present disclosure. Referring to FIG. 14, the transmission module 110I includes a TE-polarized grating coupler (TEGC) 142, a TM-polarized grating coupler (TMGC) 144, a first modulator 116_1, a second modulator 116_2, a combiner 150, and an edge coupler 152. The TE-polarized grating coupler 142 is capable of relaying a TE-polarized optical signal to the first modulator 116_1. The first modulator 116_1 is configured to modulate the TE-polarized optical signal in accordance with an electrical signals $S_{E1}$, and thereby generate a first modulated signal $S_{M1(TE)}$. The first modulated signal $S_{M1(TE)}$ is relayed to the combiner 150.

The TM-polarized grating coupler 144 is capable of relaying a TM-polarized optical signal to the second modulator 116_2. The second modulator 116_2 is configured to modulate the TM-polarized optical signal in accordance with an electrical signals $S_{E2}$, and thereby generate a second modulated signal $S_{M2(TM)}$. The second modulated signal $S_{M2(TM)}$ is relayed to the combiner 150. The first modulated signal $S_{M1(TE)}$ and the second modulated signal $S_{M2(TM)}$ are combined together via the combiner 150 and relayed to an optical fiber via the edge coupler 152.

Figure 15:
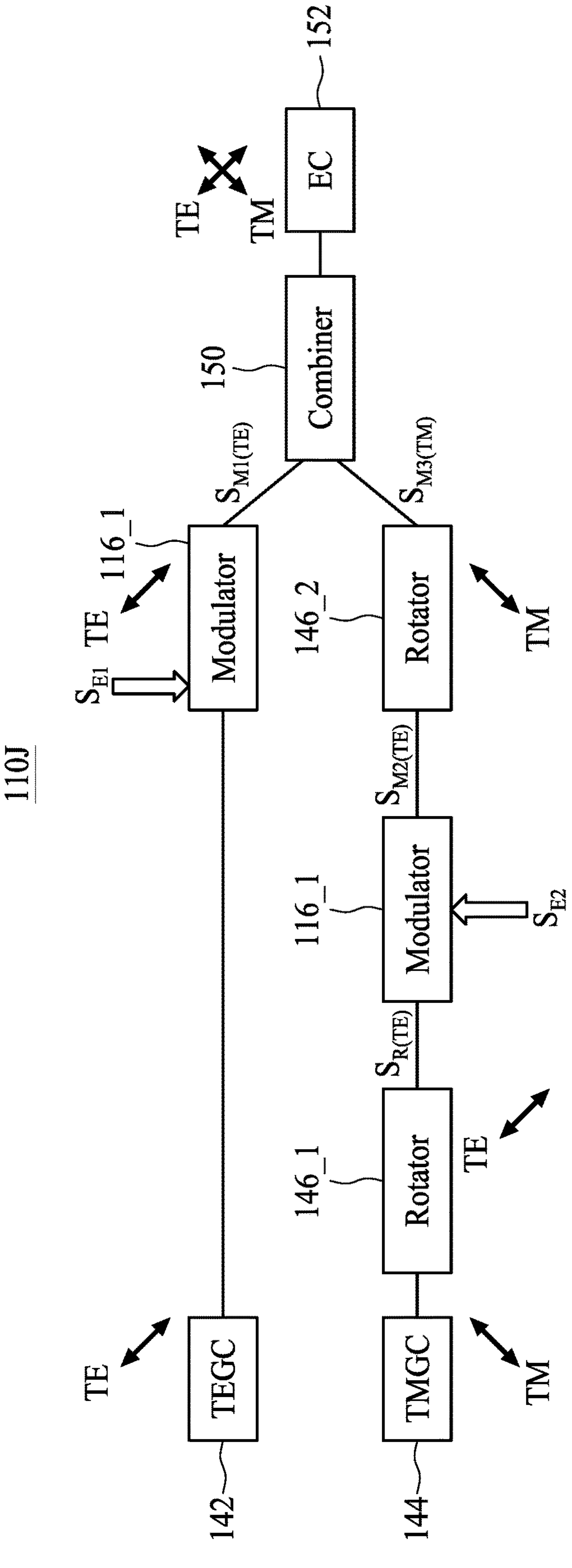
FIG. 15 is a circuit diagram of a transmission module in accordance with some embodiments of the present disclosure.

FIG. 15 is a schematic block diagram of a transmission module 110J in accordance with some embodiments of the present disclosure. Referring to FIG. 15, the transmission module 110J includes a TE-polarized grating coupler (TEGC) 142, a TM-polarized grating coupler (TMGC) 144, a pair of first modulators 116_1, a first rotator 146_1, a second rotator 146_2, a combiner 150, and an edge coupler (EC) 152. The TE-polarized grating coupler 142 is capable of relaying a TE-polarized optical signal to one of the first modulators 116_1. The first modulator 116_1 is configured to modulate the TE-polarized optical signal in accordance with an electrical signals $S_{E1}$, and thereby generate a first modulated signal $S_{M1(TE)}$.

The TM-polarized grating coupler 144 is capable of relaying a TM-polarized optical signal to the first rotator 146_1. The first rotator 146_1 is a polarization rotator. The first rotator 146_1 is arranged between the TM-polarized grating coupler 144 and one of the first modulators 116_1. The first rotator 146_1 is configured to change polarization of the TM-polarized optical signal from the TM polarization to the TE polarization, thereby generating a rotated signal $S_{R(TE)}$.

The first modulator 116_1 is configured to modulate the rotated signal $S_{R(TE)}$ in accordance with an electrical signals $S_{E2}$, and thereby generate a second modulated signal $S_{M2(TE)}$. The second modulated signal $S_{M2(TE)}$ is then relayed to the second rotator 146_2. The second rotator 146_2 is capable of changing polarization of the second modulated signal $S_{M2(TE)}$ from the TE polarization to the TM polarization, thereby generating a third modulated signal $S_{M3(TM)}$. The first modulated signal $S_{M1(TE)}$ and the third modulated signal $S_{M3(TM)}$ are combined together via the combiner 150 and relayed to an optical fiber via the edge coupler 152.

Figure 16:
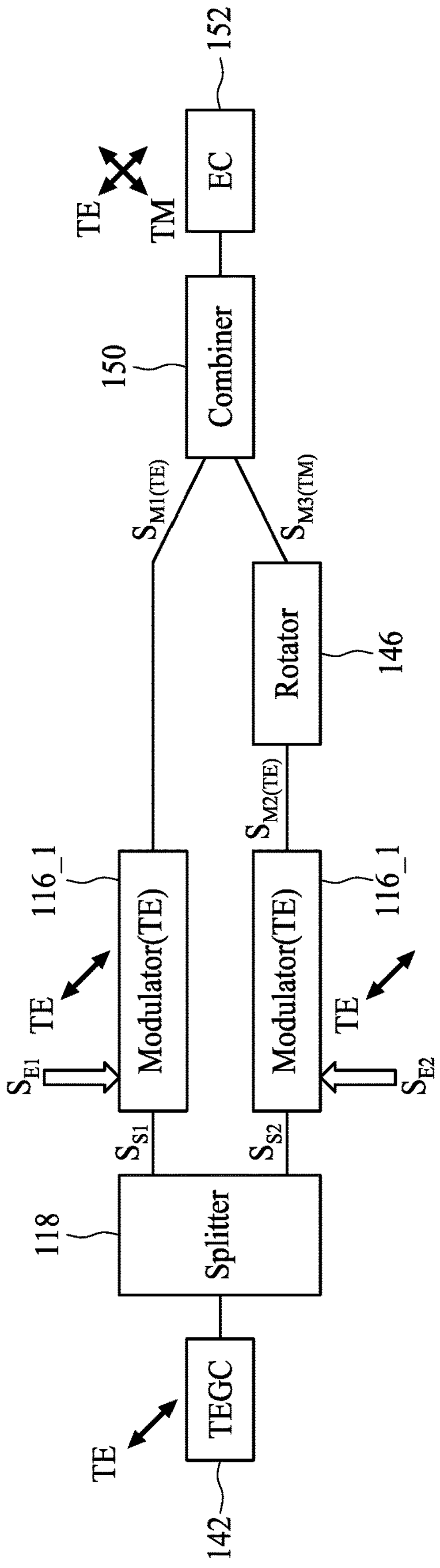
FIG. 16 is a circuit diagram of a transmission module in accordance with some embodiments of the present disclosure.

FIG. 16 is a schematic block diagram of a transmission module 110K in accordance with some embodiments of the present disclosure. Referring to FIG. 16, the transmission module 110K includes a TE-polarized grating coupler (TEGC) 142, a splitter 118, a pair of first modulators 116_1, a rotator 146, a combiner 150, and an edge coupler (EC) 152. The TE-polarized grating coupler 142 is capable of relaying a TE-polarized optical signal to the splitter 118. The splitter 118 is capable of splitting the TE-polarized optical signal into a first polarized signal $S_{S1}$ and a second polarized signal $S_{S2}$ having TE polarization.

One of the first modulators 116_1 is configured to modulate the first polarized signal $S_{S1}$ in accordance with an electrical signals $S_{E1}$, and thereby generate a first modulated signal $S_{M1(TE)}$. The other first modulator 116_1 is configured to modulate the second polarized signal $S_{S2}$ in accordance with an electrical signals $S_{E2}$, and thereby generate a second modulated signal $S_{M2(TE)}$. The rotator 146 is capable of changing polarization of the TE-polarized optical signal from the TE polarization to the TM polarization, thereby generating a third modulated signal $S_{M3(TM)}$. The first modulated signal $S_{M1(TE)}$ and the third modulated signal $S_{M3(TM)}$ are combined together via the combiner 150 and relayed to an optical fiber via the edge coupler 152.

Figure 17:
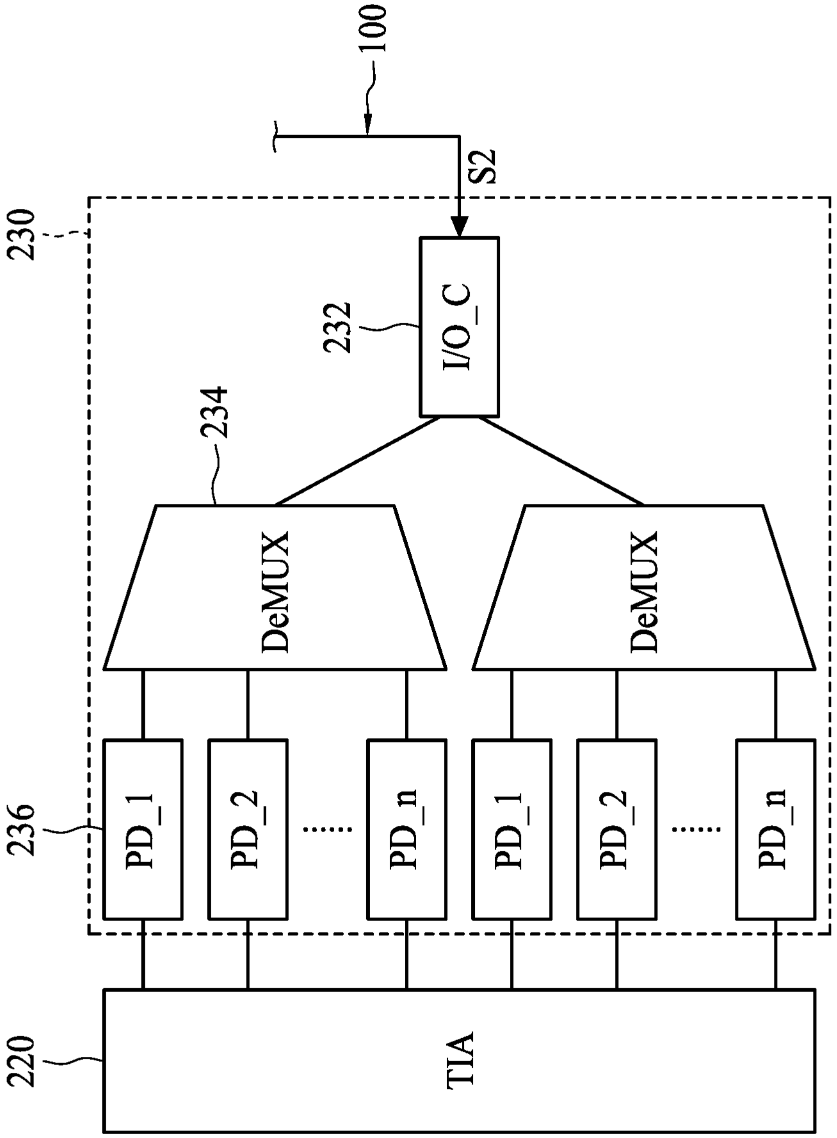
FIG. 17 is a schematic block diagram of a reception module in accordance with some embodiments of the present disclosure.

FIG. 17 is a schematic block diagram of a reception module 210 in accordance with some embodiments of the present disclosure. Referring to FIG. 17, the reception module 210 may include an optical transimpedance amplifier (TIA) 220 and a second optical circuitry 230. The optical transimpedance amplifier 220 may include a plurality of electronic devices integrated into a second electronic die. The second optical circuitry 230 includes a plurality of optical and optoelectronic devices, wherein the optical and optoelectronic devices may be integrated into a second photonic die. The second photonic die and the second electronic die may be stacked in a 3DIC structure. The second electronic die may be bonded to the second photonic die through, for instance, hybrid bonding.

In some circumstances, the second electronic die has a relatively short service life compared to a service life of the second silicon photonic die, so that the service life of the reception module 210 expires earlier. Such short service life of the reception module 210 may pose critical challenges to a service life and reliability of the overall device. The reception module 210 may thus include multiple second electronic dies including the optical transimpedance amplifier 220. Only one second electronic die is activated during the normal operation of the reception module 210, and the other second electronic dies serve as backup electronic dies that can be used to replace failed dies during normal operation. Therefore, an overall service life of the reception module 210 can be extended.

Figure 18:
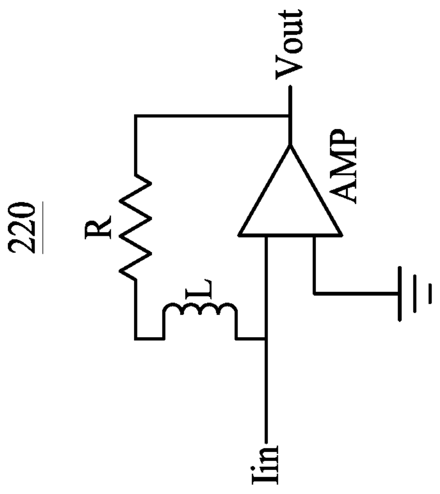
FIG. 18 is a circuit diagram of an optical transimpedance amplifier in accordance with some embodiments of the present disclosure.

FIG. 18 is a circuit diagram of an optical transimpedance amplifier 220 in accordance with some embodiments of the present disclosure. With reference to FIG. 18, the optical transimpedance amplifier 220 receives an input current signal Iin and generates an output voltage signal Vout. The optical transimpedance amplifier 220 may be adapted to high frequency and may include an operational amplifier AMP, an inductor L, and a resistor R. A non-invert input terminal of the operational amplifier AMP is grounded. The inductor L and the resistor R are coupled between an invert input terminal and an output terminal of the operational amplifier AMP. More particularly, a first end of the inductor L is connected to the invert input terminal of the operational amplifier AMP, a second end of the inductor L is connected to a first end of the resistor R, and a second end of the resistor R is connected to the output terminal of the operational amplifier AMP.

Referring back to FIG. 17, the second optical circuitry 230 includes a third optical coupler (I/O_C) 232, a pair of optical demultiplexers (DeMUX) 234, and a plurality of photodetectors (PD_1 to PD_*n*) 236. In some embodiments, the third optical coupler 232 is the two-dimensional grating coupler 200 shown in FIG. 6. More particularly, the grating structure 206 may be utilized to separate a TE-polarized signal from a TM-polarized signal. The grating structure 206 is capable of transmitting the TE-polarized signal and the TM-polarized signal to the first taper structure 202 and the second taper structure 204, respectively.

Figure 19:
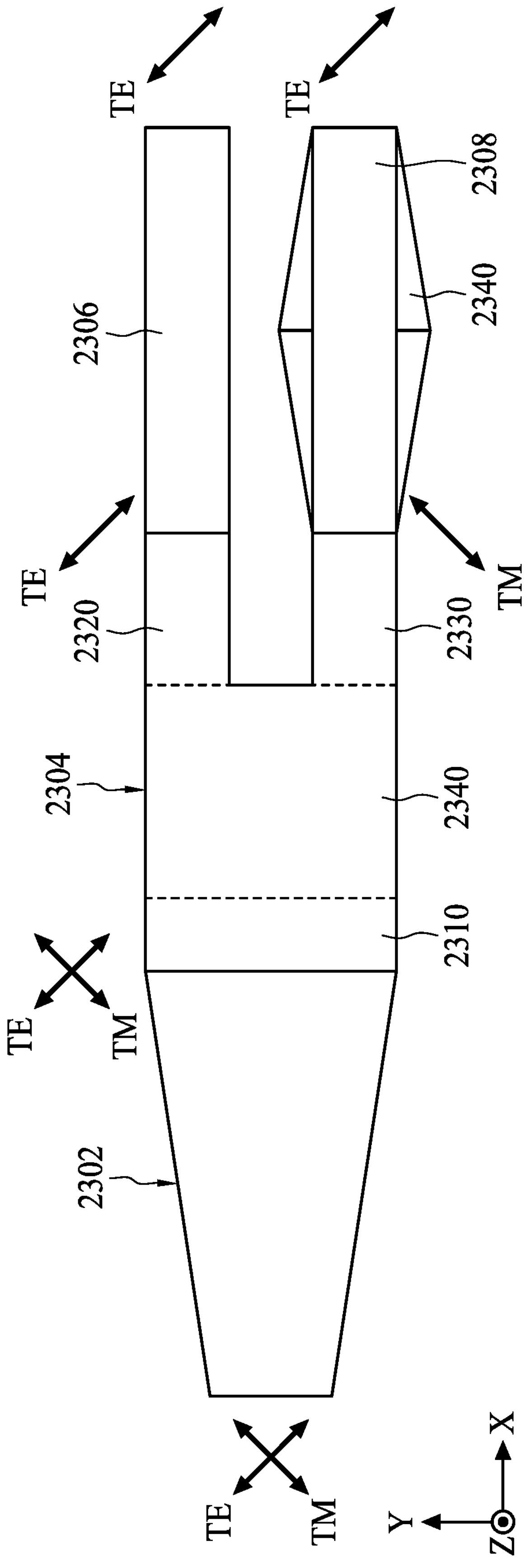
FIG. 19 is a schematic diagram of an optical coupler in accordance with some embodiments of the present disclosure.
Figure 20:
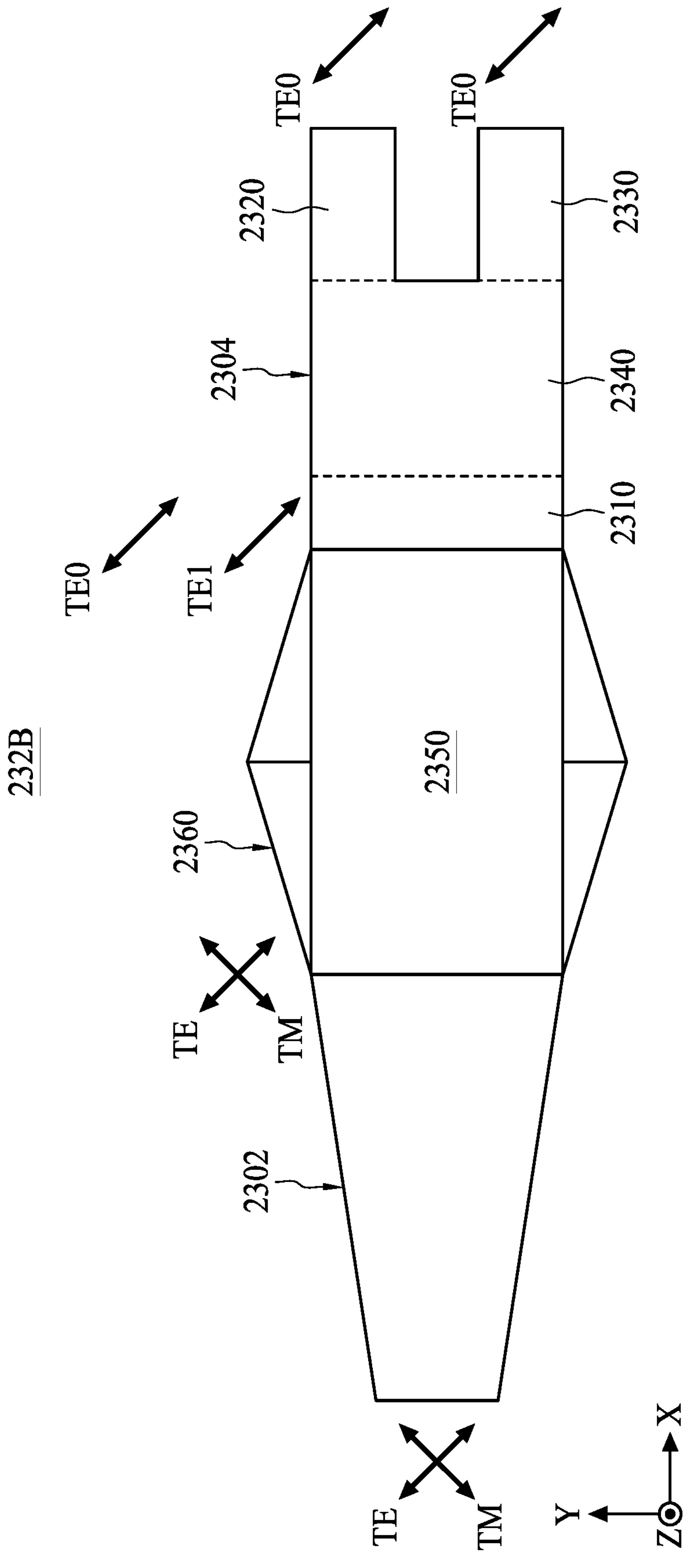
FIG. 20 is a schematic diagram of an optical coupler in accordance with some embodiments of the present disclosure.

In alternative embodiments, the third optical coupler 232 can be implemented by an optical coupler 232A depicted in FIG. 19 or an optical coupler 232B depicted in FIG. 20. With reference to FIG. 19, the optical coupler 232A includes an edge coupler 2302, a polarizing beam splitter (PBS) 2304, a pair of waveguides 2306 and 2308, and a polarization rotator 2340. The edge coupler 2302 is used to transmit optical signals between the reception module 230 and the optical fiber 100. The polarizing beam splitter 2304 is operable to separate polarized optical signals in TE and TM modes from a received optical signal (e.g., the output optical signal $S_{OUT}$ shown in FIG. 5). In some embodiments, the edge coupler 2302 has a tapered shape having a width that increases gradually, wherein the incoming optical signal propagates through the edge coupler 2302 to the polarizing beam splitter 2304. The polarizing beam splitter 2304 includes an input portion 2310 connected to the edge coupler 2302, a first output portion 2320, a second output portion 2330, and a TE-TM separation portion 2340 connecting the input portion 2310 to the first and second output portions 2320 and 2330.

The TE-TM mode separation portion 2340 is used to separate the optical signals polarized in the TE mode from the received optical signal, and to provide the TE-polarized signal to the first output portion 2320. In addition, the TE-TM separation portion 2340 is further used to separate the TM-polarized signal from the received optical signal, and to provide the TM-polarized signal to the second output portion 2330.

In some embodiments, the waveguides 2306 and 2308 are connected to the first and second output ports 2320 and 2330 of the polarizing beam splitter 2304, respectively. The polarization rotator 2340 is optically coupled to the waveguide 2308. The polarization rotator 2340 is configured to rotate the TM-polarized signal into a TE-polarized signal, and the optical coupler 2320 thus outputs two branches of TE-polarized signals.

With reference to FIG. 20, the optical coupler 232B includes an edge coupler 2302, a polarizing beam splitter 2304, a waveguide 2350, and a polarization rotator 2360. The waveguide 2350 is interposed between the edge coupler 2302 and the polarizing beam splitter 2304. The polarization rotator 2360 is optically coupled to the waveguide 2350. The polarization rotator 2360 is configured to rotate an incoming TM-polarized signal into a first-order TE-polarized signal (TE1). Therefore, the optical coupler 232B outputs two branches of optical signals, wherein one of the branches propagates a zero-order TE-polarized signal (TE0), and another of the branches propagates the first-order TE-polarized signal (TE1).

Referring back to FIG. 17, each of the optical demultiplexers 234 includes an input port and a plurality of output ports; the input port of each of the optical demultiplexers 234 is coupled to the third optical coupler 232 to receive a TE-polarized signal or a TM-polarized signal. Each optical demultiplexer 234 outputs a plurality of demultiplexed optical signals having different wavelengths through different output ports. The photodetectors 236 are coupled to the output ports of the optical demultiplexers 234 and configured to determine an intensity and/or a phase of a received optical signal and generate a detection result. The detection result is provided to the optical transimpedance amplifier 220.

Figure 21:
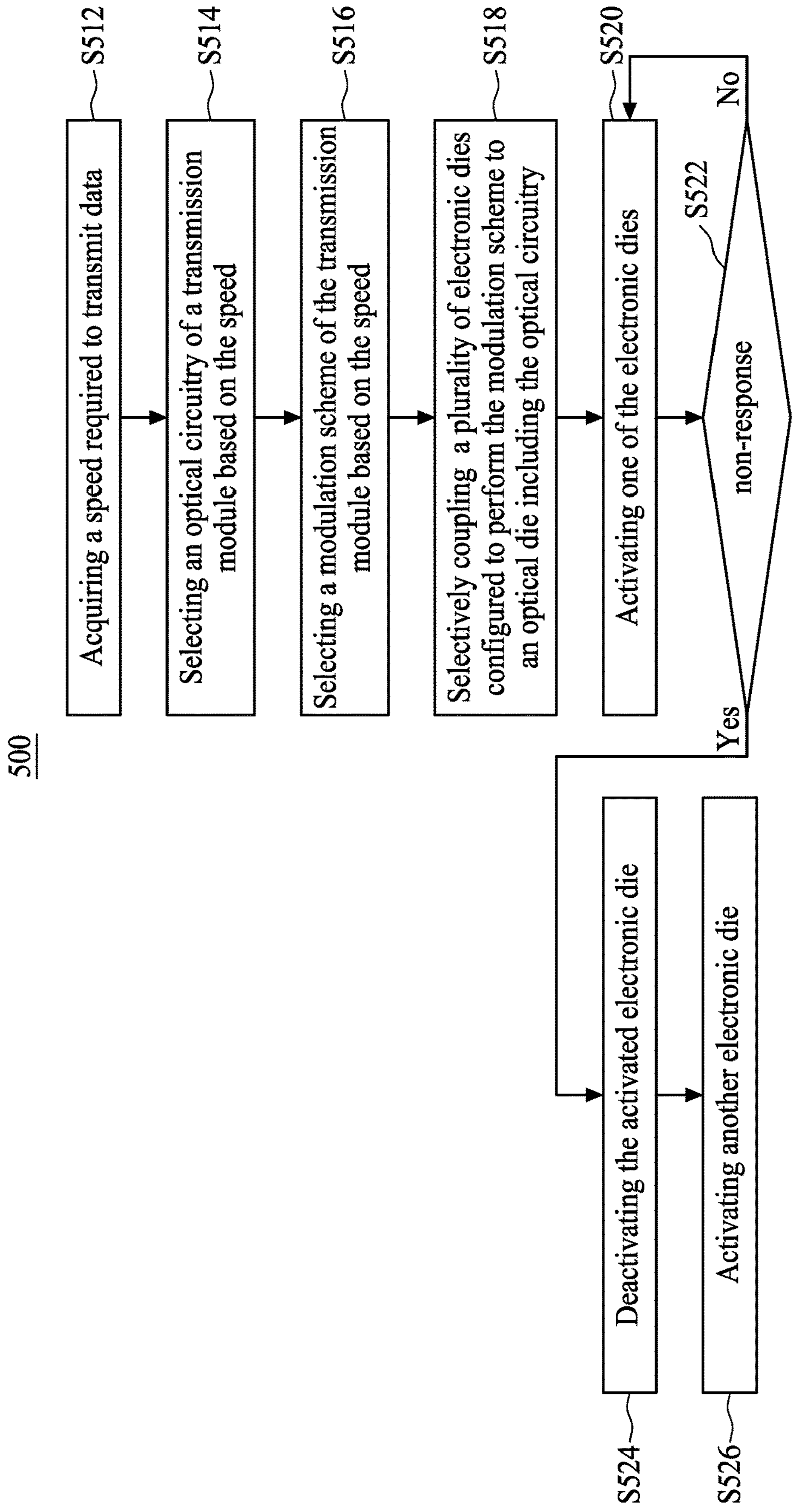
FIG. 21 is a flowchart illustrating a method of signal transmission in accordance with some embodiments of the present disclosure.

FIG. 21 is a flowchart illustrating an exemplary method of signal transmission in accordance with some embodiments of the present disclosure. Some of the operations may be performed simultaneously, or in an order different from that shown in FIG. 21. The method 500 is described with reference to FIGS. 1 and 5. However, the method 500 is not limited to the example embodiments.

Referring to FIG. 21, the method 500 includes a step S512 of acquiring a speed required to transmit data; a step S514 of selecting an optical circuitry of a transmission module based on the speed; a step S516 of selecting a modulation scheme of the transmission module based on the speed; a step S518 of selectively coupling a plurality of electronic dies to an optical die, wherein the plurality of electronic dies are configured to perform the modulation scheme, and the optical die includes the optical circuitry; a step S520 of activating one of the electronic dies; a step S522 of determining whether the activated electronic die is non-responsive; a step S524 of deactivating the activated electronic die if it is determined to be non-responsive, and a step S526 of activating another electronic die.

Referring to FIGS. 1, 5 and 21, the method 500 can begin at step S512, in which a speed required to transmit data is acquired. The data is, for example, transmitted by one or more optical signals. The speed may be determined by a user. The method 500 then proceeds to step S514, in which an optical circuitry of a transmission module is selected based on the speed. The optical circuitry may be selected from at least one of the transmission modules 110A to 110K mentioned above. The optical circuitry may include one or more modulator to modulate the optical signals. In some embodiments, a splitter 118 and a multiplexer 120 can be used to increase a data-carrying capacity of the resulting optical communication system 10. In some embodiments, each of the transmission modules 110A to 110K is formed in an optical die.

The method 500 continues with step S516, in which a modulation scheme of a transmission module is selected based on the speed. In some embodiments, the modulators of the optical circuitry is configured to modulate the optical signals with the selected modulation scheme. The modulation scheme may be selected from QAM, PAM4, or NRZ mentioned above. The modulation scheme may be implemented by an electronic circuitry, and the electronic circuitry is, for example, formed in an electronic die.

Subsequently, the method 500 proceeds to step S518, in which a plurality of electronic dies configured to perform the selected modulation scheme are selectively coupled to the optical die having the selected optical circuitry, thereby forming a transmission module. The transmission module is configured to transmit data to an optical fiber at the desired speed.

After the formation of the transmission module having desire optical circuitry and modulation scheme, voltages and/or current are supplied to the transmission module to activate one of the electronic dies, thereby performing a data transmission operation (step S520).

Subsequently, the method 500 proceeds to a determination step S522. In step S522, it is determined whether the activated electronic die is non-responsive. If the determination is negative (i.e., if the activated electronic die is responsive), the method 500 returns to step S520, and the selected electronic die remains activated. If, on the other hand, the determination is positive (i.e., if the activated electronic die is non-responsive), the activated electronic die is considered to be in an abnormal state, and the method 500 proceeds to step S524. In step S524, the activated electronic die is deactivated. The method 500 then proceeds to step S526, in which another electronic die is activated. In some embodiments, an alarm signal can be issued if all of the electronic dies are non-responsive.

In accordance with some embodiments of the present disclosure, an optical communication system is provided. The optical communication system includes an optical fiber, a transmission module, and a reception module. The transmission module includes a first optical circuitry operable to: receive a plurality of input optical signals and data; modulate the plurality of input optical signals in accordance with the data and a polarization state of the input optical signals to generate a plurality of modulated optical signals; combine the plurality of modulated optical signals to form a combined signal; and relay the combined optical signal to the optical fiber. The optical fiber transmits the modulated optical signal to the reception module for detection.

In accordance with some embodiments of the present disclosure, an optical communication system is provided. The optical communication system includes an optical fiber, a transmission module, and a reception module. The transmission module receive a plurality of input optical signals and data. The transmission module includes a plurality of modulators, a combiner, and a first optical coupler. The plurality of modulators are configured to modulate the plurality of input optical signals in accordance with the data and a polarization state of the input optical signals to generate a plurality of modulated signals. The combiner is coupled to the plurality of modulators and configured to combine the plurality of modulated signals to form a combined optical signal. The first optical coupler is coupled to the combiner and used to relay the combined optical signal to the optical fiber. The optical fiber transmits the combined optical signal to the reception module for detection.

In accordance with some embodiments of the present disclosure, a method of signal transmission is provided. The method includes steps of acquiring a speed required to transmit data; selecting an optical circuitry of a transmission module based on the speed; selecting a modulation scheme of the transmission module based on the speed; and selectively coupling a plurality of electronic dies to an optical die, wherein the plurality of electronic dies are configured to perform the modulation scheme, and the optical die includes the optical circuitry.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical communication system, comprising:

an optical fiber;

a transmission module comprising a first optical circuitry and a plurality of data generators, wherein the first optical circuitry is operable to:

activate a first data generator of the plurality of data generators and deactivate the plurality of data generators other than the first data generator;

receive a plurality of input optical signals and data generated by the first data generator;

modulate the plurality of input optical signals in accordance with the data and a polarization state of the plurality of input optical signals to generate a plurality of modulated optical signals;

combine the plurality of modulated optical signals to form a combined optical signal; and relay the combined optical signal to the optical fiber; and a reception module, wherein the optical fiber transmits the combined optical signal to the reception module for detection, wherein the plurality of data generators other than the first data generator are configured to serve as backup data generators of the first data generator.

2. The optical communication system of claim 1, wherein the plurality of input optical signals have different wavelengths, and the first optical circuitry is further operable to:

aggregate the plurality of input optical signals to generate a wavelength division multiplexed (WDM) optical signal, and modulate the WDM optical signal in accordance with the data and one of the wavelengths of the plurality of input optical signals.

3. The optical communication system of claim 2, wherein the first optical circuitry is further operable to:

split the WDM optical signal to output a first polarized signal and a second polarized signal prior to the modulating of the WDM optical signal.

4. The optical communication system of claim 1, wherein the first optical circuitry is further operable to:

rotate the polarization state of at least one of the input optical signals.

5. The optical communication system of claim 1, wherein the first optical circuitry is further operable to:

rotate the polarization state of at least one of the modulated optical signals.

6. The optical communication system of claim 1, wherein the reception module is operable to:

receive the combined optical signal;

demultiplex the combined optical signal to output a plurality of demultiplexed optical signals having different wavelengths; and determine intensities or phases of the plurality of demultiplexed optical signals and generate corresponding detection results.

7. An optical communication system, comprising:

an optical fiber;

a transmission module configured to receive a plurality of input optical signals and data, wherein the transmission module comprises:

a plurality of modulators configured to modulate the plurality of input optical signals in accordance with the data and a polarization state of the plurality of input optical signals to generate a plurality of modulated signals;

a combiner coupled to the plurality of modulators and configured to combine the plurality of modulated signals to form a combined optical signal;

a first optical coupler coupled to the combiner and used to relay the combined optical signal to the optical fiber; and a plurality of data generators, wherein a first data generator of the plurality of data generators is configured to generate the data, wherein when the first data generator is activated, the plurality of data generators other than the first data generator are deactivated, wherein the plurality of data generators other than the first data generator are configured to serve as backup data generators of the first data generator; and a reception module, wherein the optical fiber transmits the combined optical signal to the reception module for detection.

8. The optical communication system of claim 7, wherein the transmission module further comprises:

a multiplexer configured to receive the plurality of input optical signals having different wavelengths and generate a WDM optical signal; and a splitter coupled to the multiplexer and configured to receive the WDM signal and provide a first polarized signal and a second polarized signal, wherein the plurality of modulators is operable to modulate the WDM optical signal in accordance with the data and the wavelengths of the plurality of input optical signals.

9. The optical communication system of claim 8, wherein the transmission module further comprises:

a plurality of multiplexers, wherein each multiplexer receives the plurality of input optical signals at different wavelengths and configured to generate a WDM optical signal to at least one of the modulators.

10. The optical communication system of claim 8, wherein the transmission module further comprises a second optical coupler configured to relay the input optical signals to the multiplexer.

11. The optical communication system of claim 10, wherein the transmission module further comprises a first rotator coupled between the second optical coupler and at least one of the modulators.

12. The optical communication system of claim 11, wherein the transmission module further comprises a second rotator coupled between at least one of the modulators and the first optical coupler.

13. The optical communication system of claim 7, wherein the first optical coupler is an edge coupler.

14. The optical communication system of claim 7, wherein the combiner and the first optical coupler are integrated to form a two-dimensional grating coupler.

15. The optical communication system of claim 7, wherein the transmission module further comprises a rotator coupled between at least one of the modulators and the first optical coupler.

16. The optical communication system of claim 7, wherein the first data generator is configured to generate the data for modulating the plurality of input optical signals.

17. The optical communication system of claim 7, wherein the reception module comprises:

a third optical coupler configured to receive the combined optical signal;

a plurality of demultiplexers operable to demultiplex the combined optical signal and output a plurality of demultiplexed optical signals having different wavelengths; and a plurality of photodetectors configured to determine intensities or phases of the plurality of demultiplexed optical signals and generate corresponding detection results.

18. A method of signal transmission, comprising:

acquiring a speed required to transmit data;

selecting an optical circuitry of a transmission module based on the speed from a plurality of optical circuitries formed in an optical die;

selecting a modulation scheme of the transmission module based on the speed;

coupling a first electronic die of a plurality of electronic dies to the optical die, wherein the plurality of electronic dies are configured to perform the modulation scheme and bonded to the optical die, and the plurality of electronic dies other than the first electronic die are configured to serve as backup electronic dies of the first electronic die; and activating the first electronic die, and deactivating the plurality of electronic dies other than the first electronic die.

19. The method of claim 18, further comprising:

determining whether the first electronic die is non-responsive; and in response to the first electronic die being determined to be non-responsive, activating a second electronic die of the plurality of electronic dies.

20. The method of claim 19, further comprising:

deactivating the first electronic die that is non-responsive; and issuing an alarm signal if all of the plurality of electronic dies are non-responsive.

* * * * *